United States Patent Office 3,634,330
Patented Jan. 11, 1972

3,634,330
CATALYST FOR OXIDATION OF HYDROCHLORIC ACID FOR USE IN THE PREPARATION OF CHLORINATED HYDROCARBONS
Max Michel, Yerres, Gerard Benaroya, Bois-Colombes, and Roland Jacques, Ales, France, assignors to Produits Chimiques Pechiney-Saint-Gobain, Neuilly-sur-Seine, France
No Drawing. Filed Apr. 22, 1969, Ser. No. 818,405
Claims priority, application France, Apr. 24, 1968, 149,248
Int. Cl. B01j 11/78
U.S. Cl. 252—441
3 Claims

ABSTRACT OF THE DISCLOSURE

An oxidation catalyst for hydrogen chloride formed of a catalytic component of cupric chloride and at least one chloride of a metal selected from the group consisting of an alkaline metal, an alkaline earth metal and a rare earth metal in combination with a support for the catalytic component in the form of spheroidal particles composed essentially of silica and containing at least one compound of a metal selected from the group consisting of a metal of the group II–a, III–b and IV–b of the periodic table of elements, having an atomic weight below 178 and alumina, said support having a specific surface area within the range of 40–400 m.$^2$/g.

---

This invention relates to catalysts adapted for use as a fluidized or moving bed catalyst in the oxidation of hydrochloric acid by molecular oxygen, as for the purpose of preparing chlorinated hydrocarbons.

It is known that the oxidation of hydrochloric acid by molecular oxygen or mixtures of molecular oxygen with inert gases, such as air, referred to as Deacon reactions, yields chlorine. This reaction can be catalyzed by a large variety of catalysts, including catalysts composed of metal compounds having different valences, with possible association with compounds of another metal deposited on various supports.

It is also known that by introduction of different hydrocarbons into the reaction medium, it is possible to obtain a wide range of chlorinated hydrocarbons having a wide variety of valuable uses or which may be used as intermediates in the preparation of certain chlorinated organic polymers.

However, because of the highly exothermic character of the reaction with Deacon type catalysts, it is desirable to seek the desired reactivity at temperatures as low as possible. The same is not necessary for the more complex reactions when hydrocarbons are present, generally referred to as oxychlorination.

With these reactions, in order to obtain a particular chlorinated hydrocarbon or a mixture of chlorinated hydrocarbons, it is important not only to take into consideration the proportions and the nature of the different components of the reaction medium, but also the reaction temperature which depends upon the primary hydrocarbon to be chlorinated. As a result, the nature of catalysts active at these temperatures is taken into consideration along with other factors, such as contact time, and the type of catalytic system such as the fluidized, moving or fixed bed.

These reactions produce certain undesirable chlorinated derivatives as by-products, as well as oxidative degradation of the hydrocarbons being treated, with corresponding formation of carbon dioxide. Such degradation increases with increase in reaction temperature.

In conclusion, it can be said that the catalyst for the selected reactions should also be characterized by such other properties as chemical stability, which generally is a compromise between the increase in the volatility of certain components as a function of the operating temperature and the resistance to the mechanical causes of degradation, a consideration which is important in fluidized or moving beds. The solutions heretofore proposed call for a very large diversity in the formulae and methods of catalyst preparation. Too frequently these formulae and their methods of preparation do not apply sufficiently accurately to one or more chlorination reactions being considered and the results obtained are often far from optimum.

Generally speaking, frequent recommendations have been made of copper, principally in the form of its chloride, to which compounds of other metals can be added for purposes of decreasing its fairly sensitive volatility or modifying its catalytic properties. For such purposes, compounds of alkali, alkaline earth metals, and rare earth metals have been added.

On the other hand, tests have been made on the catalyst supports. While little consideration has been given to the supports for Deacon type catalyst, more recent tests have shown the importance of the support on the results obtained in the oxychlorination of hydrocarbons. For instance, these tests have shown a tendency of supports having a large surface area, such as silica gels or active alumina, to promote oxidation reactions of hydrocarbons. As a result, in many industrial applications, use has been made of oxychlorination catalyst supports composed of natural materials, such as clays and diatomaceous earth, which have fairly satisfactory general properties, although their low solidity and lack of regularity give inferior results with regard to certain synthetic products. This tendency towards the use of natural products as supports is particularly noticeable in fluidized or moving bed systems.

However, the aptitude towards fluidization can be better met with artificial products. Thus fluidization aptitude is connected with other properties, such as good heat conductivity of the granules, granules of quasi-spherical form, granules having hard and smooth surfaces which embody a high resistance to attrition and a texture entailing good mechanical strength without interference with the desired porosity.

These fluidized bed or moving bed catalytic systems have been the subject of considerable research and are particularly interesting when it is desired to produce a diversity of products and in which such diversity can be varied at will. The reaction temperature can be better maintained within certain parameters determined to obtain the desired results. For instance, temperatures of a relatively high value permit more post-chlorinated hydrocarbons to be obtained without entailing excessive destruction of the treated hydrocarbons by oxidation.

In applications Ser. No. 730,604, filed May 20, 1968, entiled "Fluid Bed Oxychlorination of Ethylene," now abandoned Ser. No. 730,605, filed May 20, 1968, entitled "Oxychlorination of Ethylene With Fluid Bed Catalyst," and Ser. No. 730,611, filed May 20, 1968, entitled "Preparation of C$_2$ Saturated Chlorinated Compounds by Oxychlorination of Ethylene and Vinyl Chloride With a Fluid Bed Catalyst," now Pat. No. 3,579,597, description is made of the oxychlorination either of ethylene alone or mixed in different proportions with vinyl chloride, to which 1,2-dichloroethane can be added. The catalyst is composed of mixtures of cupric chloride and potassium chloride with the presence of chlorides of rare earth metals deposited on supports such as attapulgite granules or silica beads. In these applications, the reaction temperatures are between 280–300° C. and 370° C. At these temperature ranges, the catalysts were shown to be satisfactory and useful in large scale operations.

However, as previously stated, the resistance to attrition of the catalysts, and their increased activity without increase in the oxidation of hydrocarbons, are areas believed to be capable of improvement.

It is an object of this invention to produce catalysts intended for use in fluidized or moving beds in which improvement resides in the catalyst support having an area within the range of 40–400 m.$^2$/g., said support being composed of spheroidal particles formed essentially of hydrated silica and containing at least one other component selected from the compounds of the metals of the groups II–a, III–b and IV–b of the Mendeleev periodic table of elements, having an atomic weight below 178, with alumina optionally present. The catalytically active part of the catalyst is formed of a mixture of cupric chloride and at least one chloride of a metal selected from the group of alkali and alkaline earth metal chlorides, with rare earth metal chlorides being able eventually to be present.

More particularly, the content of the composite support, other than silica, calculated as their corresponding oxides, ranges up to 35% and preferably within the range of 15–30% by weight of the supports, the catalytically active parts, calculated as metals, ranging from 2–15% by weight and preferably within the range of 5–10% by weight of the entire catalyst.

Another object of this invention resides in the methods of obtaining these catalysts and their use, especially in oxychlorination reactions as fluidized or moving beds, and more particularly in the oxychlorination of ethylene, ethane and their chlorinated related products.

The presence of compounds of the metals of groups II–a, III–b and IV–b in the spheroidal particles formed mainly of hydrated silica, with the combined use of such supports of a catalytically active composition which includes cupric chlorides, chlorides of alkali and alkaline earth metals and eventually chlorides of rare earth metals, decreases considerably the tendency for degradation of the hydrocarbons by oxidation, while permitting operation at temperatures at which appreciable proportion of post-chlorinated hydrocarbons is obtained. By use of the fluidized beds, it is possible to obtain the excellent mechanical properties of spheroidal particles formed of silica gel, while markedly improving the results obtained in the catalyed reactions.

It is known that spheroidal particles of hydroxides, particularly those containing hydrated silica, have been the subject of considerable concern, their methods of preparation and properties. In a preceding application Ser. No. 741,873, filed July 2, 1968, and entitled "Spherical Particles of Hydroxide and Method," description is made of a method for preparation of such particles by mixing sols and hydroxide suspensions with the formation of particles having desirable structures and porosity, after addition of meal compounds of Groups II–a, III–b and IV–b, and others containing magnesia, the structure of which leads towards the phylliteous minerals, which are described in the aforementioned application. Some of the hydroxide particles are particularly well adapted for use as supports of oxychlorination catalysts which are the subject matter of this invention.

The following first six examples illustrate the results of oxychlorination of ethylene with catalysts prepared in accordance with the practice of this invention and Examples 7–9 illustrate, by way of comparison, the results obtained by conventional catalysts of the type previously employed.

For purposes of comparison, the test conditions of the nine examples have been maintained as uniform as possible. The reactor, maintained at a temperature of 340° C., is constructed of a vertical, hard glass tube having an internal diameter of 2 cm. and an amount of catalyst measured to a height of 7.5 cm. when at rest, with the average diameter of the catalyst granules being 80 m$\mu$ for all tests. Fluidization of the catalyst is obtained by gas flow of an ethylene mixture with hydrochloric acid gas and air, the ethylene flow rate being calculated as 8 l./h., measured at normal pressure and temperature, the normal ratio of HCl/C$_2$H$_4$ being equal to 2.25 and the molar ratio of O$_2$/C$_2$H$_4$ being equal to 0.70. This corresponds to an approximate contact time of 1 second. At the outlet of the reactor, the chromatographically analyzed gas flow is composed of a small amount of unconverted ethylene, a small amount of carbon dioxide and a mixture of chlorinated hydrocarbons formed for the most part of 1,2-dichloroethane and lesser amounts of 1,1,2-trichloroethane and symmetrical tetrachloroethane. All tested catalysts were made by impregnation of different previously prepared supports by means of an aqueous solution of the metallic chlorides selected as catalytically active elements in amounts to obtain the desired proportions of the catalytic elements as hereinafter described.

Example 10 is an industrial test with the catalyst of Example 1 operating under the conditions stated in Example 10.

For all examples, the following characteristics and results are indicated:

Nature of the support for the catalyst.

Nature of the catalytic materials and their proportions, by reference to the metals, expressed in percent by weight of the catalyst.

Specific area of the support of the catalyst in m.$^2$/g.

Attrition loss, expressed in percent by weight of catalyst, obtained similarly for all catalysts by individual agitation tests.

Total conversion rate of ethylene, $X_g$.

Conversion rate of ethylene into CO$_2$, $X_{CO_2}$.

The selectivity $Se_1$, ratio of conversion rate of ethylene into 1,2-dichloroethane to the total conversion rate of ethylene.

The selectivity $Se_2$, ratio of conversion rate of ethylene into 1,1,2-trichloroethane to the total conversion rate of ethylene.

The selectivity $Se_3$, ratio of conversion rate of ethylene into symmetrical tetrachloroethane to the total conversion rate of ethylene.

Ratio $\varphi$ of the amount of 1,1,2-trichloroethane and symmetrical tetrachloroethane produced to the amount of 1,2-dichloroethane, 1,1,2-trichloroethane and symmetrical tetrachloroethane, expressed in moles. This ratio indicates the capacity of catalyst to give a mixture of the stated chlorinated hydrocarbons, that is to say, the degree of non-selectivity.

EXAMPLE 1

To a suspension in water of silica hydrogen beads obtained by coagulation of silica sol drops in a water immiscible liquid and the silica content of which, calculated in SiO$_2$, being 10% by weight, there is added the desired quantity of magnesium nitrate in order to obtain a catalyst support containing 25% by weight magnesia MgO, after screening, drying to 110° C. and calcining for 1 hour at 700° C. This dry support having the grain sizes previously stated and the specific area of 150 m.$^2$/g., is impregnated by an aqueous solution of cupric chloride and of potassium chloride containing 350 g. CuCl$_2$ and 160 g. KCl per liter, at the rate 0.6 liter solution per kg. of support. After drying, the copper and potassium content are respectively 8% and 4% of its weight. The results of the tests carried out according to the process previously described are:

| | |
|---|---|
| Attrition loss | 0.8 |
| $X_g$ | 84 |
| $X_{CO_2}$ | 0.4 |
| $Se_1$ | 85.5 |
| $Se_2$ | 9 |
| $Se_3$ | 2.6 |
| $\varphi$ | 12 |

EXAMPLE 2

Beads are obtained by mixing silica sol, an alumina suspension and magnesia. After that they are aged at 90° C., then calcined until the value of their specific area is 170 m.$^2$/g. The composition by weight, at the calcined state, is 60% $SiO_2$, 20% $Al_2O_3$ and 20% $MgO$, their sizes being those already stated. In a manner generally similar to that described in the preceding example, there is added cupric chloride and potassium chloride, in such a way that the catalyst, when ready for use, contains 10% and 6% of its weight of each one of both metals.

The results of oxychlorination tests carried out are:

| | |
|---|---|
| Attrition loss | 0.8 |
| $X_g$ | 86 |
| $X_{CO_2}$ | 0.4 |
| $Se_1$ | 86.5 |
| $Se_2$ | 8.8 |
| $Se_3$ | 3 |
| $\varphi$ | 12.1 |

EXAMPLE 3

To the same support as that stated in the preceding example, there is added, by impregnation, quantities of cupric chloride, potassium chloride and chloride of the natural mixture of rare earth metals such as is present in monazite, corresponding respectively to 8%, 4% and 4% by weight of the metals based on the weight of catalyst ready for use.

The test results carried out by means of this catalyst are:

| | |
|---|---|
| Attrition loss | 0.8 |
| $X_g$ | 89 |
| $X_{CO_2}$ | 0.6 |
| $Se_1$ | 81.7 |
| $Se_2$ | 9.7 |
| $Se_3$ | 6 |
| $\varphi$ | 16.1 |

EXAMPLE 4

Silica hydrogel beads in suspension in water, similar to those of Example 1, are impregnated by a solution of zirconyl nitrate, then treated in the general manner similarly to that described in this example, to provide a product ready for use containing 24% by weight zirconia $ZrO_2$ and shows a specific area of 300 m.$^2$/g. This support is impregnated with cupric and potassium chlorides in an amount to provide a copper and potassium content of the catalyst ready for use of 7% and 2.8%.

The test results carried out by means of this catalyst are:

| | |
|---|---|
| Attrition loss | 1.1 |
| $X_g$ | 74.5 |
| $X_{CO_2}$ | 0.6 |
| $Se_1$ | 85.5 |
| $Se_2$ | 10.2 |
| $Se_3$ | 1.45 |
| $\varphi$ | 12 |

EXAMPLE 5

The same silica hydrogel beads as those of Example 1 are calcinated to provide a specific area of 110 m.$^2$/g. They are impregnated by a concentrated solution of beryllium chloride to incorporate, after drying, about 2.5% by weight Be. By a second impregnation there is added to them cupric and potassium chlorides to incorporate in the catalyst ready for use, 7% Cu and 3% K.

The results obtained are the following:

| | |
|---|---|
| Attrition loss | 1.2 |
| $X_g$ | 80 |
| $X_{CO_2}$ | 0.3 |
| $Se_1$ | 85.2 |
| $Se_2$ | 10.6 |
| $Se_3$ | 1.3 |
| $\varphi$ | 12.2 |

EXAMPLE 6

The same calcinated silica beads as those of the preceding example are impregnated by a calcium chloride solution, then treated by diluted sulphuric acid, to incorporate, after drying, 5% $SO_4Ca$. By a second impregnation there is added cupric and potassium chlorides in such a way that the catalyst ready for use contains 8% Cu and 4% K.

The results obtained are the following:

| | |
|---|---|
| Attrition loss | 1.1 |
| $X_g$ | 83 |
| $X_{CO_2}$ | 0.5 |
| $Se_1$ | 86.8 |
| $Se_2$ | 9.2 |
| $Se_3$ | 1.5 |
| $\varphi$ | 11 |

The preceding examples show that the catalysts of the invention, in accordance with their composition, permit different fairly high values of the ratio $\varphi$ expressing the nonselectivity as also of different values of the ratios $Se_2$ and $Se_3$ to be obtained.

By way of comparison, Examples 7, 8 and 9, which follow, show that the known and generally used ratios give catalysts having few satisfying properties in at least one of the previously considered scopes.

EXAMPLE 7

Silica beads, having an average diameter of 80 m$\mu$ and a specific area of 150 m.$^2$/g., obtained by calcination of hydrogel beads by impregnation in a general way stated in the preceding examples, were used to prepare a catalyst ready for use containing 10% by weight copper and 5% potassium, these metals being in the form of chlorides.

The results obtained are the following:

| | |
|---|---|
| Attrition loss | 1.1 |
| $X_g$ | 62 |
| $X_{CO_2}$ | 3 |
| $Sc_1$ | 85.7 |
| $Sc_2$ | 5.3 |
| $Sc_3$ | 0.2 |
| $\varphi$ | 6 |

The attrition loss is acceptable but the conversion rate is too low, the oxidation loss is too high and the nonselectivity is insufficient.

EXAMPLE 8

Beads composed of silica and alumina having a 180 m.$^2$/g. specific area and sizes already stated were used to prepare a catalyst containing 8% by weight copper and 4% potassium set in the form of chlorides.

| | |
|---|---|
| Attrition loss | 1 |
| $X_g$ | 81 |
| $X_{CO_2}$ | 2 |
| $Sc_1$ | 82 |
| $Sc_2$ | 10.1 |
| $Sc_3$ | 2.4 |
| $\varphi$ | 13 |

The values of attrition loss, conversion rate and nonselectivity are slightly convenient, but that of the combustion rate is too high.

EXAMPLE 9

Natural screened and calcinated clay having a 140 m.$^2$/g. specific area and the same granular size as that used for catalysts of the preceding examples is impregnated with cupric chloride and potassium chloride to incorporate 10% and 5% by weight of both of these metals in the catalyst ready for use.

The test results are the following:

| | |
|---|---|
| Attrition loss | 5 |
| $X_g$ | 77 |
| $X_{CO_2}$ | 0.4 |
| $Sc_1$ | 87 |
| $Sc_2$ | 8.1 |
| $Sc_3$ | 1.9 |
| $\varphi$ | 10.3 |

The main defect of this catalyst is its lack of resistance to attrition.

EXAMPLE 10

The same catalyst as that used in Example 1 is placed into a metal reactor of 120 mm. in diameter in such an amount that the bed at rest measures 2.05 m. in height. This bed is fluidized by a mixture of hydrogen chloride, oxygen and ethylene at a rate of 50 cm./sec., the pressure in the reactor being 7 bars absolute. The ratio $HCl/C_2H_4$ of the gaseous mixture is 2.26 and the ratio $O_2/C_2H_4$ is 0.80. The operating temperature is 340° C.

The results obtained are the following:

| | |
|---|---|
| $X_g$ | 98 |
| $X_{CO_2}$ | 0.8 |
| $Sc_1$ | 82 |
| $Sc_2$ | 11.5 |
| $Sc_3$ | 2 |
| $\varphi$ | 14 |

This example shows that the good results obtained under laboratory test conditions by means of catalysts containing the features of this invention are retained in an industrial operation and that particularly the combustion rate does not reach an excessive value.

It will be understood that the foregoing Examples 1–6 and 10 are given by way of illustration, and not by way of limitation. The different compounds allied with silica may be supplied at any time in the preparation of the support and in various forms. Similarly, the catalytic active metals may be supplied in other forms than their chlorides provided that the chlorides can subsequently be obtained, either during the oxidation reaction of hydrogen chloride or before. Finally, the hydrochloric acid subjected to oxidation may be derived from various sources, such for example as by production in situ from the mineral compounds.

We claim:
1. An oxidation catalyst for hydrogen chloride consisting essentially of a catalytic component formed of cupric chloride and at least one chloride of a metal selected from the group consisting of an alkali metal, an alkaline earth metal and a rare earth metal deposited on a synthetic support in the form of spheroid particles consisting essentially of 15 to 35% by weight of at least one oxide of a metal selected from the group consisting of the Group II-*a* metals, the Group III-*b* metals and the Group IV-*b* metals having an atomic weight below 178 and the balance being silica, said support having a surface area within the range of 40 to 400 m.²/g., with the catalytic component being present in an amount within the range of 2 to 15% by weight.

2. A catalyst as claimed in claim 1 in which the support includes alumina.

3. A catalyst as claimed in claim 1 in which the catalytic component comprises 5 to 10% by weight of the entire catalyst including the support.

References Cited

UNITED STATES PATENTS

| | | | |
|---|---|---|---|
| 2,498,552 | 2/1950 | Kilgren et al. | 252—441 X |
| 2,547,928 | 4/1951 | Davis et al. | 252—441 X |
| 2,838,577 | 6/1958 | Cook et al. | 260—662 A X |
| 3,148,222 | 9/1964 | Penner et al. | 252—441 X |
| 3,210,158 | 10/1965 | Engel et al. | 23—219 |
| 3,345,422 | 10/1967 | Piester et al. | 260—659 A X |
| 3,449,450 | 6/1969 | Bohl et al. | 260—659 A X |

PATRICK P. GARVIN, Primary Examiner

U.S. Cl. X.R.

23—219; 260—659 A